United States Patent Office 3,446,932
Patented May 27, 1969

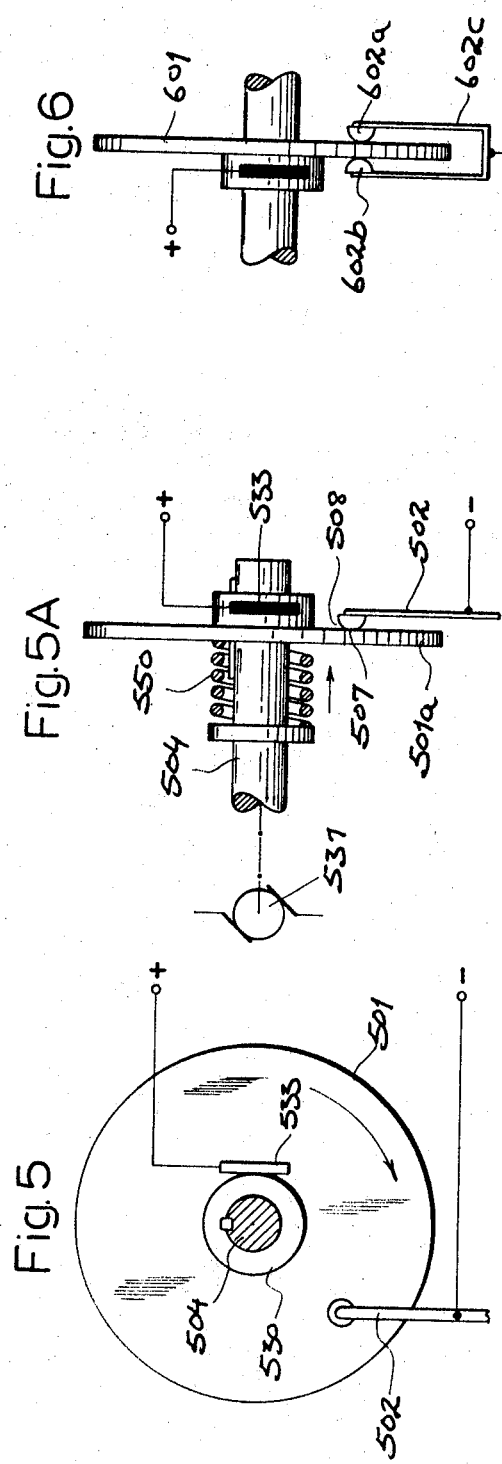

3,446,932
METHOD OF AND APPARATUS FOR THE SPARK DISCHARGE DEPOSITION OF METALS ONTO CONDUCTIVE SURFACES
Nikola R. Belopitov, Sofia, Bulgaria, assignor to Nautchno-Izsledovatelski i Proektno-Konstruktorski Institut Po Elektrotechnitscheska Promishlenost, Sofia, Bulgaria
Filed Oct. 8, 1965, Ser. No. 494,069
Claims priority, application Bulgaria, Oct. 8, 1964, I-824
Int. Cl. B23k 9/04
U.S. Cl. 219—76
20 Claims

ABSTRACT OF THE DISCLOSURE

Method of and apparatus for the coating of a substrate with conductive material wherein a pendulously supported coating electrode disk carried by an oscillation-damped arm bears against substrate resiliently supported at two spaced-apart locations (e.g. a continuous tensioned band or endless conveyor carrying a number of bodies). A discharge is generated between the disk, which may have a continuous or discontinuous surface, and the substrate while the disk is rotated in contact with the substrate to produce solely by this means a vibration of flutter of the substrate. The discharge also serves to carry portions of the electrode disk material onto the substrate.

The arm may be provided with an oscillation damper and is held against the substrate under the control of an adjustable weight. The electric pulses are applied in series with a spark gap connected across a capacitor.

My present invention relates to a method of and an apparatus for the spark discharge deposition of noble metals, hard metals and hard-facing materials and other metals onto conductive surfaces and especially less-noble, soft or other substances to which it is desired to bond to the coating material. Thus this invention bears upon the subject matter of my U.S. Patent No. 3,028,478 issued April 3, 1962 and entitled: Method and Apparatus for Reducing Contact Noises in Electrical Devices.

In the aforementioned patent, I describe and claim a process and an apparatus for improving the conductive properties of a contact member by juxtaposing it with a consumable anode composed of a metal more conductive than the contact member and vibrating the anode toward and way from the cathodic contact member without touching it, while periodically applying a breakdown potential across these electrodes to deposit, by spark discharge, the anode material upon the contact member. In dealing with electrical contacts in general, it has been recognized that noble metals (i.e. metals such as gold, platinum and like metals of high electrical conductivity and low corrosivity) are commonly provided upon the contacts of low-current electronic and electrical devices for reduction of switching noises and contact background noises which commonly occur in such devices; similarly, the rest contacts of high-current devices are also provided with highly conductive layers designed to minimize sparking, reduce losses due to contact resistance and diminish contact wear, thereby prolonging the life of the unit. In both cases, while it is desirable to apply the contact material i.e. the noble or highly conductive metal of low corrosivity, on only a portion of the contact member, at least partly because of the high cost of the coating material, it is found that this result is not amenable to mass production by conventional methods. It has been proposed to apply the more efficient contact materials at spaced locations along a continuous band of conductive sheet metal or to completely coat the latter which is subsequently subdivided to form conductive members. Various methods including galvanic deposition, hot-pressing and dipping have been used to bond the contact material to the conductive substrate. In conjunction with these methods the contact portion of the substrate is sometimes stamped, pressed or embossed so as to be formed with protuberances upon which the coating material is deposited.

Regardless of the method of deposition, it has been found in practical terms that the prior-art methods discussed above are unsatisfactory since the coating usually is relatively soft and the bond between the coating material and the substrate is generally weak.

I have discovered that the aforementioned disadvantages can be obviated and coatings of highly conductive low corrosive metals can be produced when the metal is deposited upon the substrate with the aid of electric spark discharge as generally described in my above-identified patent. It appears that the coating material is more firmly bonded to the substrate and is substantially harder than can be attained with other methods because of an absorption of nitrogen from ambient air at the elevated temperature of the discharge (i.e. from, says, 10,000° to 15,000° C.) at the small spark discharge gaps of the microporous surface. The surface cools instantly to ambient or room temperature thereby entrapping the nitrogen and giving rise to a hardened coating surface strongly resistant to mechanical wear and frictional abrasion. It is also found that spark discharge deposition yields improved resistance to electrical erosion.

It has, however, been found that electric-discharge methods known heretofore for the production of the coating on the conductive substrate were disadvantageous for certain technological reasons. For example, the vibrating means must be carefully controlled to regulate the vibration stroke and the proximity of the electrode to the cathodic substrate (interelectrode gap), Similar care must be taken in the control of lateral vibrations of electrode systems, and precise adjustment of the interelectrode distances is always a necessity. The apparatus required for this purpose is expensive and, in many instances, yields unsatisfactory results. It is especially difficult, for instance, to regulate the interelectrode distance with the exactitude required for proper deposition of the anode material without the aid of complex automatic devices, servomotors and the like.

It is, therefore, an important object of the instant invention to provide an improved method of depositing metals and metallic materials, especially materials of high electrical conductivity and low corrosivity but also hard-facing materials and the like, upon conductive surfaces in such manner that the deposits are strongly adherent to the substrate and have high wear resistance.

A further object of this invent is to provide a method of firmly bonding a metallic coating material to a substrate along limited portions thereof without the disadvantages affecting other coating methods and, especially, without the need for complex control devices for regulating interelectrode distances, without complex vibrating mechanism, etc.

Yet further object of this invention is to provide a method of and an apparatus for the spark discharge coating of metallic substrates and, especially, the deposition of highly conductive "noble" metals upon less noble metals for use as contact elements in switching devices and the like, whereby the deposition thickness and the character of the deposits can be accurately controlled without complex servomechanisms and like devices as has hitherto been required.

These objects and others which will become apparent hereinafter are attained, in accordance with my invention which is based upon the surprising discovery that the high-frequency vibrations hitherto required between the anodic metal-depositing member and the cathodic metal-receiving layer, as induced by electromagnetic means on the electrode, can be dispensed with when the anode is constituted as a thin disk which bears circumferentially against the substrate, the latter being constituted as a band or other flexible body. The disk thus osculates (i.e. contacts with second or higher order as a cylinder tangential to a plane, a cylinder contacting a cylindrical surface with a different radius, etc.) the substrate so that in the direction of displacement of at least one of the juxtaposed surfaces, i.e. the anode surface or substrate surface, a progressively widening gap extends from the contact line and is adapted to sustain a spark discharge upon application of an impulsive electric current across the rotating disk of the coating metal and the band-like substrate. Alternatively, the substrate can be formed by a plurality of contact member successively engageable with the disk which, in both cases, deposits a coating material only upon a limited region of the substrate, depending upon the width of the disk. Thus, the substrate can be considered to be continuously displaceable into osculating contact with the rotating disk whether the substrate be in form of a belt or of a plurality of contact members or the like carried by a belt.

I have found that it is an important feature of the present invention that substantially the sole control requirement for uniform application of the coating material is the pressure at which the disk bears against the portions of the substrate which it contacts.. It is, accordingly, an essential feature of the present invention that means are provided for regulating the pressure with which the disk bears against the substrate and, since this pressure can be controlled with relatively simple means, I prefer to mount the rotating disk on a lever system having weights for biasing the disk against the substrate. According to another feature of this invention, the disk is composed of a multiplicity of angularly spaced electrode portions adapted successively to be brought into contact with the substrate. It has been observed that the use of a multiplicity of electrodes gives rise to an oscillation at the discharge gap of a frequency often above that developed by convention spark discharged deposition systems and effective in a manner not unlike the effect of vibration of the latter type. Thus, if 30 electrodes are provided along the circumference of the disk and the disk speed is 6000 revolutions per minute, the electrode contact with the substrate will take place 180,000 times per minute corresponding to a vibration frequency of about 3000 cycles per second. In fact, the vibration effect has been observed also when the disk in relatively smooth surfaced presumably as a consequence of the development of the impulsive spark discharge which carries electrode material from the disk-shaped anode to the cathodic workpiece.

The control of the presure with which the disk is applied to the substrate can be accomplished automatically or by hand without lateral oscillation of the disk, vibration induced by electromagnetic means, or control of an interelectrode distance. Advantageously, the disk can be carried by a pendulous lever assembly upon which a disk is journaled and a lower extremity and provided with weights or the like with adjustable center-off gravity to fulcrum distances. I have found that it is possible to increase the widths of the coating deposited upon the bands by providing means for imparting to the disk surface a substantially periodic axial movement with respect to the band at the location at which the disk contacts the latter. This axial movement can be accomplished by mounting the disk with freedom of axial movement upon an axis or by employing a disk with undulating periphery.

The above and other objects, features and advantages of the present invention will become more readily apparent from the following description, reference being made to the accompanying drawing in which:

FIG. 5 is an end view of a coating risk according to the invention showing another method of coating substrates;

FIG. 5A is an elevational view of a portion of the apparatus of FIG. 5;

FIG. 6 is a view similar to FIG. 5A of a further modification;

FIG. 7 is a side-elevational view of a modified disk for use with the systems of FIGS. 1, 2 and 4; and FIG. 8 is a side view of another arrangement for increasing the width along which the coating material is deposited.

Figure 1:
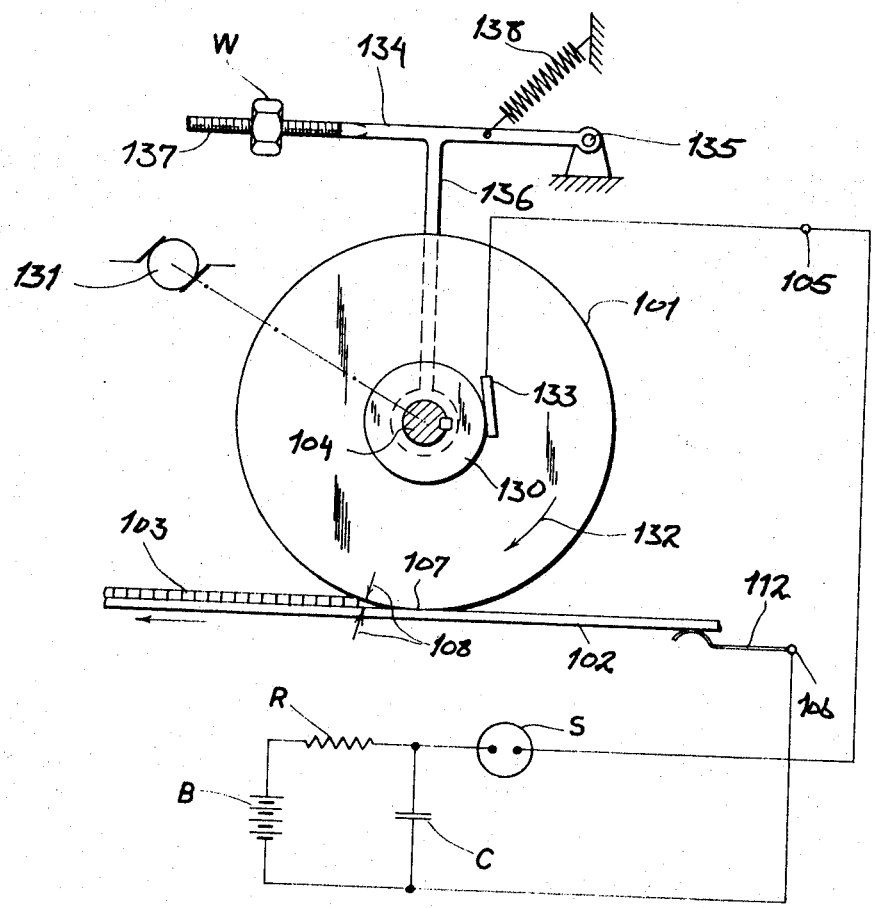
FIG. 1 is a diagrammatic vertical elevational view, partly in cross section, of an apparatus embodying the principles of the present invention.

Referring now to FIG. 1 of the drawing, it will be seen that the anode of the spark deposition device is constituted by a disk 101 of the material to be deposited, this disk having a hub 130 by means of which it is keyed to a shaft 104 of a motor or other driving means represented diagrammatically at 131. The disk 101 can thus be composed of a noble metal such as gold, platinum and like contact metals or a hard-facing material such as tungsten, hard nickel-chromium steel or the like. Disk 101 is driven in the direction of arrow 132, i.e. in the clockwise sense, and is tangential to the continuous band 102 constituting the substrate which is to be coated with the layer 103 of the coating metal. I have found that, in spite of the fact that the disk 101 is tangential to and in contact with the substrate 102 at the osculating point 107, the application of the impulsive electric across the substrate 102 and the disk 101 will cause a spark discharge to develop between the point indicated generally by the arrow 108 as the disk is drawn away from the substrate, whereupon the coating material of the disk 101 is carried by the discharge onto the substrate 102 to form the deposit 103. While any impulsive source (e.g. that shown in my aforementioned patent) can be employed to energize the system, I prefer to use a capacitor C connected in series with a charging resistance R across a direct-current source such as the battery B, the capacitance of condenser C and the charging voltage being so selected that the condenser C can charge to a level above that at which a discharge develops at point 108. To preclude premature draining of the condenser, a switching element can be used between the charging source B, C, R and the positive and negative terminals 105, 106 of the apparatus. The switching device can be a breakdown element triggered by a pulse applied to a control element or a spark gap S as shown here. When the capacitor C is fully charged, the gap S will break down to supply substantially the full capacitor charge impulsively across the disk 101 and the substrate 102 to generate the spark at 108. The frequency of discharge may be of the order discussed in the patent and is, of course, determined by the battery potential B, the ohmic value of resistor R and the capacitance of condenser C. The anode 101 is connected to its terminal 105 by a brush 133 which engages the hub 130 so that the latter forms a slip ring. A wiper 112 can be employed to connect the terminal 106 with the substrate 102.

As previously noted, it is an important feature of the present invention that means are provided for adjusting the pressure with which the disk 101 bears against the substrate. This pressure determining the point at which the discharge occurs and the uniformity of the coating. The means for urging the disk 101 against the band 102 can include a lever arrangement with, for example, a lever arm 134 fulcrumed at 135 to a support structure and carrying a depending arm 136 on which the shaft 104 of the disk 101 is journaled. The pressure of the disk 101 against the band 102 can be increased or decreased by adjusting the position of a weight W along the threaded shank 137 of the arm 134, the weight constituting a nut engaging this shank. A spring 138 can be provided if desired to balance all or part of the weight of the disk 101 so that the absolute contact pressure desired may be set by the weight W regardless of the weight of the disk.

Figure 2:
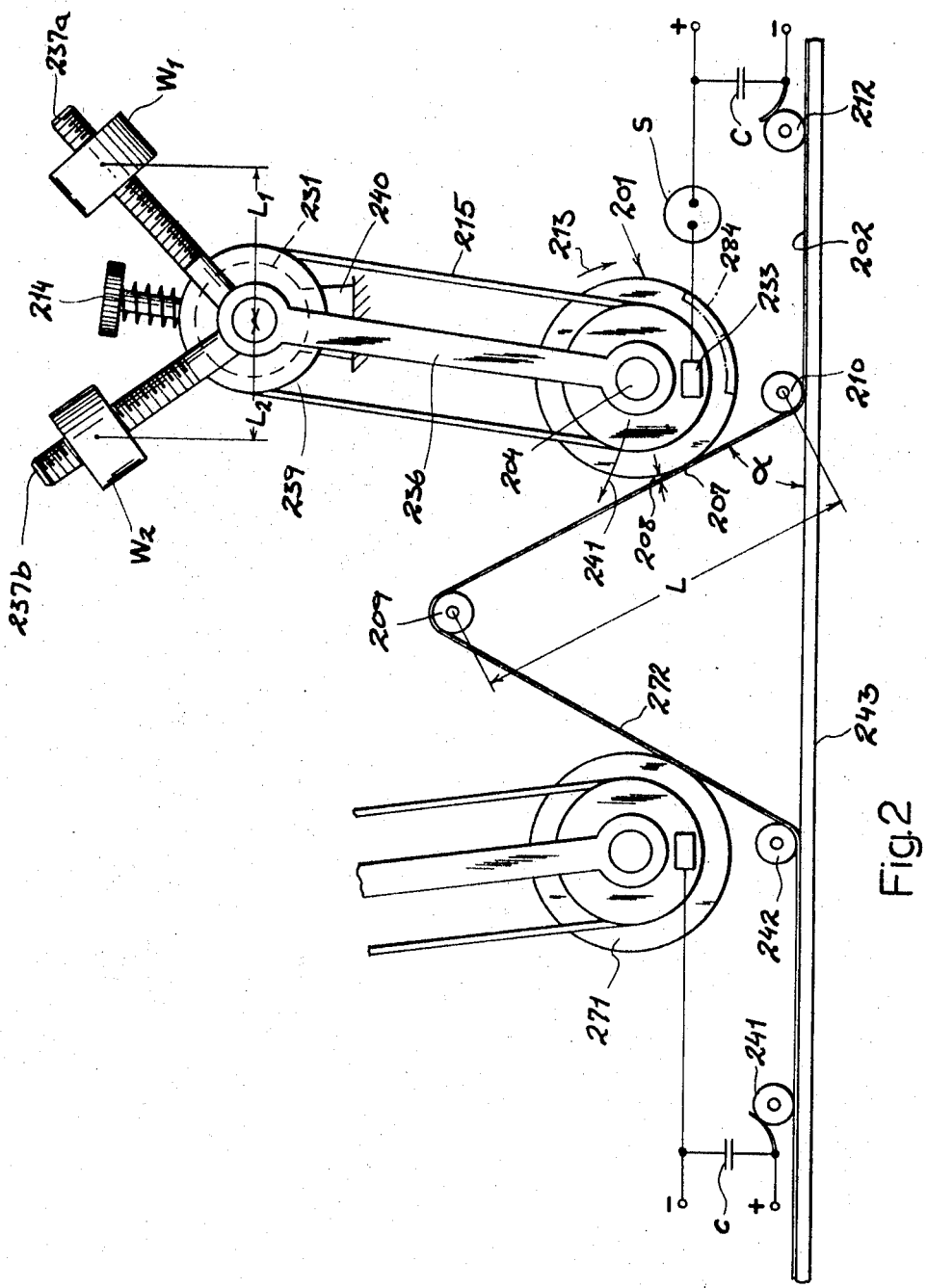
FIG. 2 is a diagrammatic elevational view of another apparatus of the type contemplated by the present invention.

In FIG. 2, I show a somewhat more advantageous construction of the apparatus in which the disk 201 is composed of the noble metal and is designed to apply this noble metal to the continuous band 202. An electric motor 231 drives the disk 201 via a drive pulley 239 and a belt 215. The shaft of the motor 231 thus carries the pulley 239 and is journaled in a pendulous arm 236. The motor is carried by a support 240 diagrammatically illustrated in FIG. 2 so that this arm is swingable about the axis of pulley 239. At the lower end of the arm 236, the shaft 204 of the disk 201 is journaled, and this disk carries the driven pulley 230 of this system which is conductive and is engaged by a wiper 233 by means of which the anode potential is delivered from the capacitor C. The capacitor is energized via the charging circuit R, B in the manner previously described. The arm 236 carries a pair of shanks 237a, 237b angularly offset about the axis of the pulley 239 and threaded to receive respective weights $W_1$, $W_2$ which can be screwed onto these shanks for adjustment of the effective moment arms $L_1$ and $L_2$, respectively; the moment of force tending to swing the arm 236 in the clockwise direction is thus $W_1 \times L_1$ whereas the force moment tending to swing the arm in the clockwise sense is essentially the product of the weight of the disk and the interaxial distance between the pulleys 239 and 230 plus ($W_2 \times L_2$). It is evident, therefore, that it is possible to adjust the resultant force tending to urge the disk 201 against any resisting element merely by proper adjustment of the positions of the weight $W_1$ and $W_2$ to vary their moment arms $L_1$ and $L_2$ respectively. Upon rotation of the disk in the clockwise sense (arrow 213) and disk 207 is urged radially in the direction of arrow 241 by the larger force moment of weight $W_1$ to bring the disk 201 to bear against the point 202 with the desired pressure. The band 202 is guided upwardly at an angle α to the horizontal over a distance L by a pair of tensioning rollers 209, 210 while further guide rollers 212, 251, 242 are provided along the table 243 for advancing the band. The roller 212 is connected with the capacitor C at its negative terminal to deliver electric current to the band under the unbalanced moment of force of weight $W_1$, the disk 201 bears tangentially upon the band 202 at the point 207 and, upon the application of a pressure impulse across the disk 201 and the band by the capacitor C, the spark discharge develops at 208 to carry material from the disk 201 onto the band.

It has been found that no further device is necessary for applying the proportionate or dosed pressure to the disk and indeed it has been observed that the same pressure is required for various diameters of the disk. The band 202 tensioned between the roller 209 and 210 is somewhat elastic and is found to vibrate or oscillate with the oscillating frequency being a function of the rate of rotation of the disk and the spark discharge frequency. This vibration appears to be effective in the manner described with respect to the vibration of my above-mentioned patent and, indeed it is observed that higher vibration frequencies are obtained than is otherwise possible. When the substrate 102 of FIG. 1 is similarly tensioned, similar oscillations occur. The deposit is controlled by varying the charging voltage, the charging current, the resistance of the charging circuit, the capacitor C of the discharge circuit, the speed of advance of the band 202 and the peripheral speed of the disk 101, 201. These parameters determine the adjustable angle α of the band, the length L and the force moment of weights $W_1$, $W_2$, all of which can be preset simply prior to commencement of the depositing operation.

In order to stabilize the disk, I provide a shock-absorbing arrangement represented by a spring-loaded oscillation damper 214 or another similar device, the disk 201 tends to become lighter at the erosion of the material and its transferral to work 202. Accordingly, the effective length of the lever arm 237b is shortened and that of lever arm 237a is increased as the axle 204 of the disk arm moves in the direction of arrow 241 and ensures that the pressure of the disk 201 against the band 202 at the point 207 remains substantially constant. The width of the deposit trace can be increased above the thickness of the disk 201 when the latter is formed with corrugations or ribs as illustrated in FIG. 7 or an axial movement is imparted to the disk by, for example, a system of the type illustrated in FIG. 8; both treatments can, however, be employed simultaneously.

Figure 3:
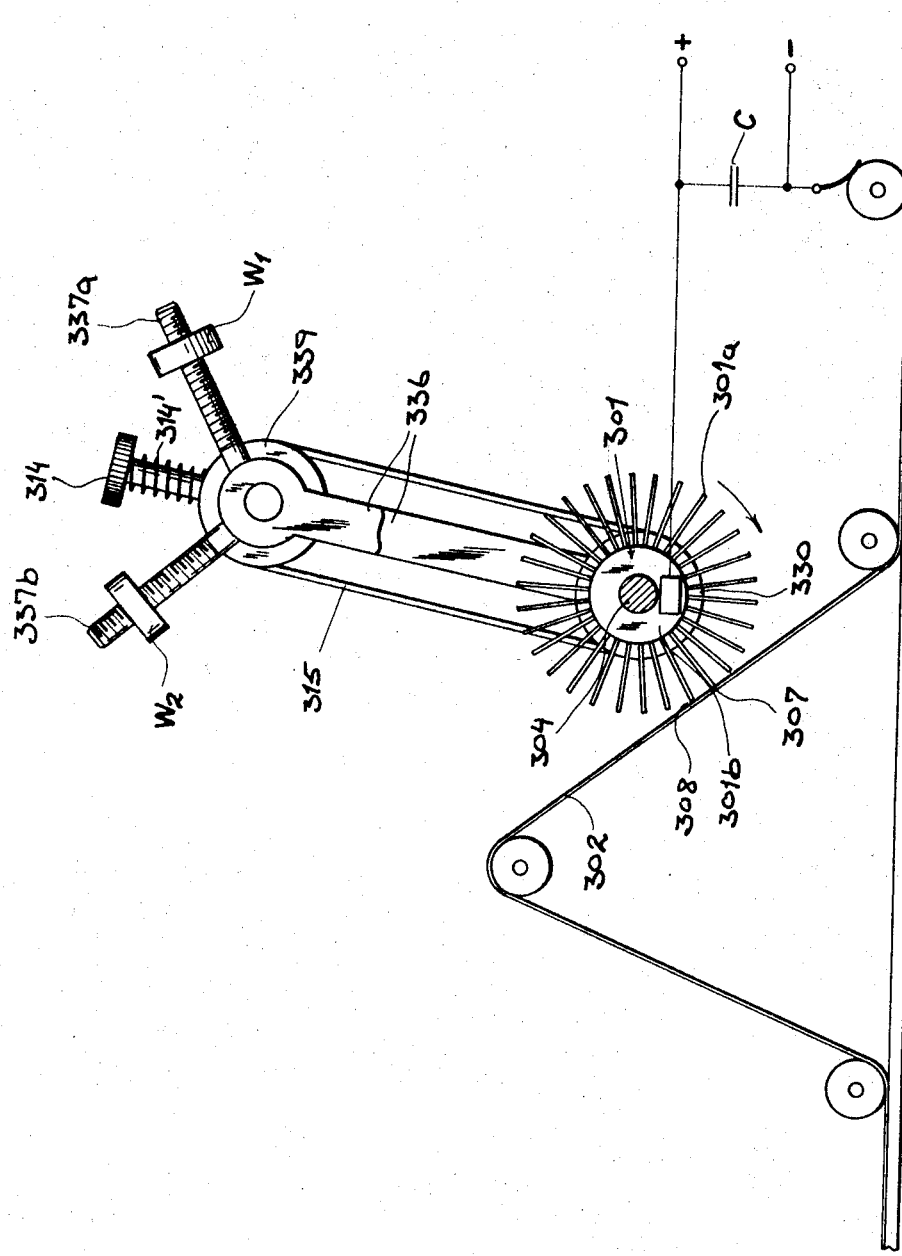
FIG. 3 is a view similar to FIG. 2 of a generally similar system with, however, the anode disk modified in accordance with another aspect of the invention.

Still better results can be obtained in accordance with the present invention with the modification of the device illustrated in FIG. 3, here the arm 336 carries a drive pulley 339 operated by a motor as described with reference to FIG. 2. In this arrangement, however, the belt 315 transmits motion to a pulley 330 which is keyed to the anode 301 by a shaft 304, the anode 301 being constituted with a multiplicity of angularly spaced rod-shaped electrodes 301a which are seated in a carrier 301b. The assembly 301a, 301b can thus be considered a disk within the meaning of this term as used for the purposes of the present disclosure, in as much as both the carrier 301b and the electrode rods 301a are substantially planar of circular configuration. The rods 301a which are biased against the substrate 302 via the weights $W_1$ and $W_2$ threaded onto shanks 337a and 337b, successively engage the workpiece at 307 where the band 302 is trangential to the circle defined by the outer parts of the rods 301a. As these rods move away from the band 302 the spark develops consonant with the discharge of the capacitor C. Again a damping mechanism 314 with a spring 314' is provided to stabilize the pendulous system 301, 336 etc. Each rod 301, as it engages the band 302, causes a displacement thereof so that the band is effectively vibrated at a frequency (cycles per second)

$$F = \frac{R(\text{r.p.m.}) \times N}{60}$$

where R is the rate of rotation of the disk in revolutions per minute and N is the number of electrode rods on the disk.

It will be understood that in order to increase the output available for an apparatus of this type a plurality of parallel, mutually insulated electrode disks can be arranged transversely athwart a single band or a conveyor having a multiplicity of bands, the several spark-deposition assemblies being energized by respective discharge circuits.

Moreover the rotating disk electrode, which can be controlled by hand or automatically, can thus be used for coating of contact and other materials with the front or side faces of the disk onto contact plates, leaf springs contacts of automatic telephone devices and exchanges or other electrical contacts as well as other surfaces for other purposes. The finished or partially finished contacts, from a continuous band or formed individually, can be provided with a contact material along limited portions thereof by an apparatus of the type illustrated in FIG. 4. In this system as well, the disk 401 bears tangentially against successive portions of the substrate, in this case individual contact members 402 as they are carried by a belt 402' of yieldable material past the disk. The belt is provided with support pockets 440 which receive the individual contact members from a feed device 441 or from an operator and carry the members past the disk 401 which is composed of the contact material of high conductivity and low corrosivity. A belt 415 connects the pulley 430 of the disk 401 with a driving pulley 439, while an arm 436 connects the pulleys and swingably supports the disk 401. The assembly is provided with weights $W_1$, $W_2$ and threaded shanks therefore as previously described (FIGS. 2 and 3). The belt 402' passes over a pair of guide rollers 409, 410 disposed at the desired angle α to the horizontal and spaced apart by the length L discussed with reference to FIG. 2. The belt 402' is composed of a conductive material so that a wiper 412 can deliver the negative polarity of the discharge from capacitor C. A wiper 433 delivers the positive potential to the disk 401. Since there are discontinuities between the receiving surfaces of the successive members, a vibration is established at the discharge location not unlike that developing in the system of the disk 301. Here, however, the speed of the rollers 409, 410 determines the oscillation rate. After being coated with the metal of disk 401, the contacts 402 fall into a bin 417.

In FIG. 5, I show a modification whereby finished or partially finished contacts stamped from sheet metal can be provided with coatings. In this arrangement, the disk 501 is urged by a spring 550, representing the weights previously described, against the contact 502 whose rounded surface engages the plate face 501a of the side of the disk. The surface of contact 502 engages this plate face at a tangent point 507 while forming a gap 508 adjacent the osculating point at which an electrode discharge is developed to deposit metal from the electrode 501 onto the contact. The latter is connected to the negative terminal of the discharge source while the positive terminal is connected via a brush 533 with the slip ring 530 of the disk 507. The shaft 504 of the disk is rotated by a motor represented at 531.

The system of FIG. 6 permits the simultaneous renewal or coating of two contacts 602a, 602b which are retained in their spring mounting 602c and thus urged thereby against the faces of the disk 601. The coating of contact elements by the present method represents an advantage over earlier systems especially when expensive contact materials are to be used. It is not necessary to coat portions of a base material which may be discarded and a significant reduction of the quantity of the material required is obtained by comparison with galvanic methods. Furthermore, a manifold increase in the hardness of the deposit and its wear-resistance are obtained.

Figure 4:
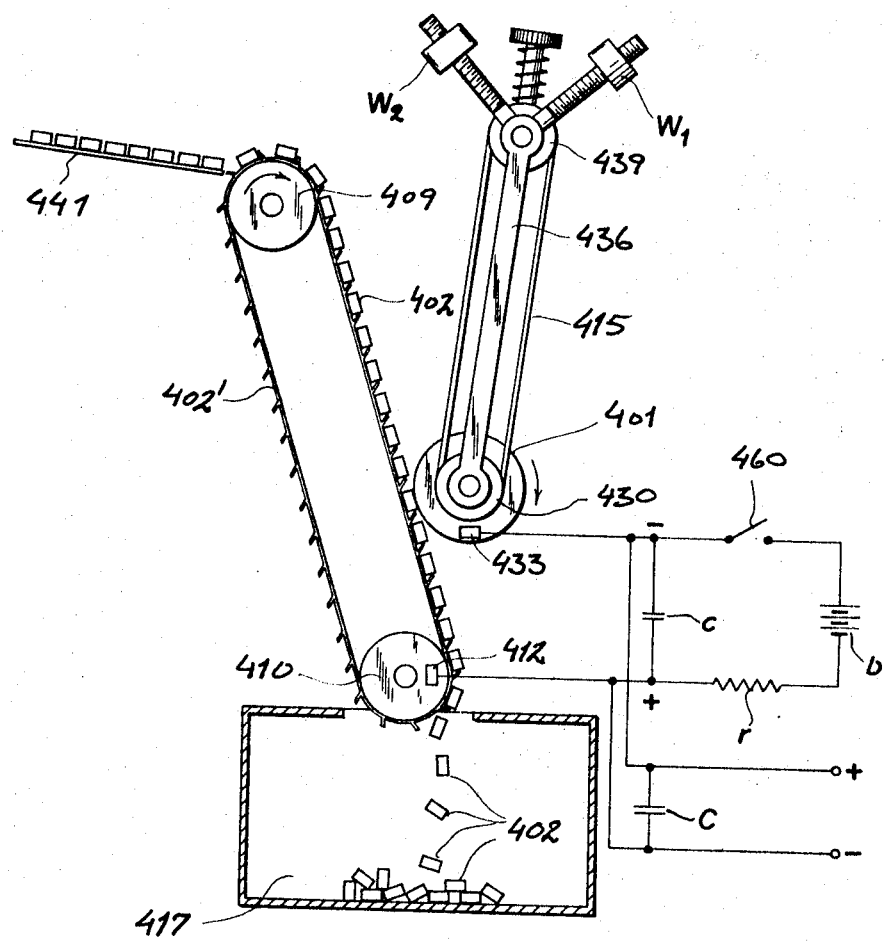
FIG. 4 is a vertical elevational view, in diagrammatic form, of an apparatus capable of coating a series of individual members according to this invention.

It has been found that one can use a similar process for polishing the deposited substrate by the spark discharge removal of points and projections of deposited layers. Furthermore, the polishing can be effected merely by rotating the disk without energization thereof or energizing the disk with a weak reverse polarity. In the latter case, the disk can be energized (as illustrated in FIG. 4) by a smaller capacitor c whose battery b is poled oppositely to the polarity of the charging source of capacitor C so that the disk 401 will be rendered cathodic while the substrate is anodic. The polishing operation is, however, effected only when the switch 460 is closed. A similar source can, of course, be used with the systems of FIGS. 1 and 2 as well. It is also possible (see FIG. 2) to provide a further disk means 271 which is held against the substrate at its stretch 272 by a weighting mechanism similar to that shown at 236 through 239. The energizing source makes use of a smaller capacitor c which is dischargeable to polish the previous deposit at a location forwardly along the transport path and which renders the disks 271 cathodic with respect to the substrate 272 although the potential applied across the resulting discharge space will be less than that developed in the case of deposition.

Referring now to FIG. 7, it will be seen that the disk 701 is corrugated or otherwise provided with ribs 781 to increase the effective thickness T of the trace 703 deposited upon the substrate 702 beyond the wall thickness t of the disk. The disk can, moreover, be composed of layers 783 of a number of different metals which, under the normal circumstances, cannot be alloyed readily. Since the several metals deposit essentially in the same region, the resulting trace has the character of an alloy and this method can be employed to produce coating of compositions which cannot be formed into discharge electrodes. Various other modifications of this principle can also be used. For example, successive electrodes 301a of the disk means 301 (FIG. 3) can be composed of different metals. The disks 101 or 201 can be provided with a number of segments (e.g. as seen at 284) of the several metals. Moreover, the individual electrode rods 301a can themselves be composed of laminated layers of the metals. Systems of this type are particularly effective, for example, for depositing magnetic permeable contact materials upon reed contacts or the like of the type designed to be enclosed in protective glass tubes; the individual rods 301a can, moreover, be vibrated individually by means such as that shown in my patent.

In FIG. 8 I show an arrangement wherein the disk 801 is engaged by a shifting fork 884 and is axially displaceable along its splined drive shaft 804, the fork reciprocated by an electromagnetc device 885 shown diagrammatically. The deposit 803 thus has a width T' equal to the stroke of the axial displacement and, consequently, in excess of the thickness t' of the disk 801.

The aforedescribed method can be used not only for the coating of contact materials onto contact members, but also for the application of decorative patterns onto suitable substrates without difficulty and for the rapid provision of hardening layers, the application of additional material to increase dimensions, the protective coating of materials and other systems where one desires to exploit other properties of the coating material. It is especially valuable for the deposition of hard metals on the edges or edge of a band from which cutting elements such as razor blades can be formed. The apparatuses illustrated in FIGS. 2 and 3 are especially significant for this purpose and can operate to improve at relatively low cost inexpensive and poor-quality steel bands so that their cutting edges have the characteristics of high-quality steels; similarly hard metals such as tungsten, chromium-nickel steel and the like can be applied to band saws, disk blades and the like or for the deposition of hard noble metals or alloys upon the spring of fountain-pen holders and the like; here the arrangement using a vibratory electrode is most suitable as the deposited metal is of great value. The system is also particularly suitable for use in the dental field; for example, it is highly desirable to use nickel-chromium alloys for insets in teeth since such alloys are hard and wear resistant. From the esthetic point of view, however, it is frequently desirable to cover the stainless steel bodies with wear-resistant gold deposits, a task substantially impossible with conventional processes because of the softness of the layer produced by gold plating or dipping. It has, however, been found, that the spark-discharge method of the present invention is particularly suitable for the deposition of a high-strength gold layer upon such substrates after the formation of the inset or upon sheet stainless steel which is later formed into dental crowns or other parts. Thus the disk for gold deposition according to the invention can be mounted upon the rotating apparatus (e.g. drill or burr holder) of the dentist to which the pulse generator for applying the discharge voltage can be connected. Each of the devices previously has also been found effective with aluminum substrate which normally cannot be readily coated with gold, silver or other contact and metal alloys.

The invention described and illustrated is believed to admit of many modifications and variations within the ability of persons skilled in the art, all such modifications being considered included within the spirit and scope of the appended claims.

I claim:
1. A method of coating metallic substrates with a high-conductivity, low-corrosivity, hard or other metal, comprising the steps of displacing the substrate along a transport path while yieldably supporting it therealong; bringing a yieldably supported portion of the substrate into osculating contact with the periphery of disk means composed at least in part of the metal and resting against said yieldably supported portion; rotating said disk means while its periphery contacts the substrate; intermittently applying an electric potential across said disk means and said substrate while rendering said disk means relatively anodic and said substrate relatively cathodic to effect a spark discharge between the periphery of the disk means and the substrate proximal to the region of osculating contact whereby said discharge carried material of said disk means onto said substrate; and controlling the deposition of the metal from the disk means onto the substrate by proportionally adjusting the pressure with which said disk means bears against said substrate.

2. The method as defined in claim 1, further comprising the step of axially shifting a portion of the peripheral surface of the disk means periodically relatively to the substrate to widen the deposit formed thereon beyond the thickness of the disk.

3. The method as defined in claim 1 wherein the pressure with which the disk means is held against the substrate is controlled by a weight coupled with the disk means by a lever system, further comprising the step of increasing the effective moment of force of the weight substantially proportionally to the decrease in size of the disk means, thereby compensating for discharge erosion of the disk means and maintaining the contact pressure substantially constant.

4. The method as defined in claim 3, further comprising the step of polishing the deposit formed on the substrate by contacting the substrate provided with the deposit with a relatively cathodic disk while the substrate is relatively anodic.

5. The method as defined in claim 4 wherein said disk constitutes part of said disk means and the electric potential applied between the disk means and the substrate is intermittently reversed to effect polishing after initial deposition of metal from the disk means onto the substrate.

6. The method as defined in claim 1 wherein said substrate is one of a succession of substrates successively engaged by the disk means and displaced along the transport path.

7. An apparatus for coating metallic substrates with a high-conductivity, low-corrosivity, hard or other metal, comprising disk means rotatable about an axis and composed at least in part of the metal; means for bringing the substrate into osculating contact with a surface of the disk means; circuit means for intermittently applying an electric potential across said disk means and said substrate with said disk means relatively anodic and the substrate relatively cathodic to effect a spark discharge between said surface and the substrate proximal to the region at which said disk means contacts said substrate whereby said discharge carries material of said disk means onto the substrate; means for controlling the pressure with which said disk means bears upon said substrate, said substrate being continuously displaceable past said disk means along a transport path; and guide means for yieldably supporting said substrate along said path.

8. An apparatus as defined in claim 7 wherein said guide means includes a pair of rollers defining a stretch of the transport path inclined to the horizontal and tangential to the periphery of said disk means.

9. An apparatus as defined in claim 8 wherein said transport path is formed by an endless belt passing around said rollers and provided with means for receiving a succession of substrate members.

10. An apparatus as defined in claim 8 wherein said substrate is an endless band and said guide rollers deflect said band along said stretch.

11. An apparatus as defined in claim 7 wherein said disk means is formed with at least one circular array of generally radial electrode members adapted to sweep across said substrate.

12. An apparatus for coating metallic substrates with a high-conductivity, low-corrosivity, hard or other metal, comprising disk means rotatable about an axis and composed at least in part of the metal; means for bringing the substrate into osculating contact with a surface of the disk means; circuit means for intermittently applying an electric potential across said disk means and said substrate with said disk means relatively anodic and the substrate relatively cathodic to effect a spark discharge between said surface and the substrate proximal to the region at which said disk means contacts said substrate whereby said discharge carries material of said disk means onto the substrate; means for controlling the pressure with which said disk means bears upon said substrate and lever means for pendulously carrying said disk means.

13. An apparatus as defined in claim 12 wherein said lever means includes a loading arm provided with an adjustable weight for regulating the pressure with which said disk means contacts said substrate.

14. An apparatus as defined in claim 12 wherein said disk means has a solid periphery.

15. An apparatus as defined in claim 12 wherein said disk means is formed with at least one circular array of generally radial electrode members adapted to sweep across said substrate.

16. An apparatus as defined in claim 12, further comprising means for axially shifting the periphery of said disk means relatively to said substrate for depositing upon said substrate a deposit trace wider than the thickness of said disk means.

17. An apparatus as defined in claim 12, further comprising means for applying an electric potential to said disk means to render said disk means cathodic while said substrate is relatively anodic to polish the deposit.

18. A method of coating a metallic substrate with a conductive coating material comprising the steps of:
(a) elastically suspending at least a portion of said substrate between two spaced-apart locations, thereby rendering said portion of said substrate vibratile between said locations;
(b) rotating an electrode disk provided with said material in contact with said portion between said locations; and
(c) applying intermittent electrical pulses across said disk and said portion of said substrate while the disk is urged into contact therewith to form a discharge between the substrate surface and said disk to carry material from said disk onto said portion of said substrate and induce vibration thereof.

19. The method defined in claim 18 wherein said substrate is a continuous band resiliently suspended between said locations, further comprising the step of continuously displacing said band past said disk.

20. An apparatus for coating a metallic substrate with a conductive material, comprising means for supporting said substrate vibratorily and elastically at two spaced-apart locations; disk means rotatable about an axis and composed at least in part of said material; means for bringing said substrate between said locations into osculating contact with a surface of said disk means; and circuit means for intermittently applying an electrical potential across said disk means and said substrate while the disk is urged into contact therewith to effect a discharge between said surface and said substrate whereby material of said disk means is carried onto said substrate and said substrate is vibrated by the formation of said discharge between said locations.

(References on following page)

References Cited

UNITED STATES PATENTS

| | | | |
|---|---|---|---|
| 3,097,291 | 7/1963 | Adcock | 219—76 |
| 3,268,705 | 8/1966 | Inoue | 219—76 |
| 3,277,266 | 10/1966 | Blaszkowski | 148—154 X |
| 3,277,267 | 10/1966 | Blaszkowski | 148—154 X |

RICHARD M. WOOD, *Primary Examiner.*

C. L. ALBRITTON, *Assistant Examiner.*

U.S. Cl. X.R.

117—207; 204—192; 219—130